US006209023B1

United States Patent
Dimitroff et al.

(10) Patent No.: US 6,209,023 B1
(45) Date of Patent: *Mar. 27, 2001

(54) SUPPORTING A SCSI DEVICE ON A NON-SCSI TRANSPORT MEDIUM OF A NETWORK

(75) Inventors: John E. Dimitroff; David L. Grant, both of Houston; Eugene E. Freeman, The Woodlands; Robert S. Gready, Spring; Raymond A. Ritter, Spring; Zuohui Zhang, Spring, all of TX (US)

(73) Assignee: Compaq Computer Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/225,437

(22) Filed: Jan. 5, 1999

Related U.S. Application Data

(63) Continuation of application No. 09/070,955, filed on May 1, 1998, now abandoned, which is a continuation-in-part of application No. 09/065,481, filed on Apr. 24, 1998, now abandoned.

(51) Int. Cl.⁷ ..................................................... G06F 13/00
(52) U.S. Cl. ......................... 709/211; 709/324; 709/326; 710/74; 710/126
(58) Field of Search ................................... 709/208, 211, 709/250, 321, 324, 326; 710/52, 62, 65, 70, 74, 126, 128, 129

(56) References Cited

U.S. PATENT DOCUMENTS

| | | | |
|---|---|---|---|
| 5,321,530 | 6/1994 | Kawaji | 348/501 |
| 5,611,056 | 3/1997 | Hotchkin | 710/101 |

(List continued on next page.)

OTHER PUBLICATIONS

Friedhelm Schmidt, The SCSI Bus & IDE Interface, Second Edition, © Addison Wesley Longman 1998, pp. 312–314.

Lamers, Lawrence J., Working Draft—X3T9.2 Project 375D, Information Technology—Small Computer System Interface—2, Revision 10L, Sep. 7, 1993, pp. 1–462.

(List continued on next page.)

*Primary Examiner*—Viet D. Vu
(74) *Attorney, Agent, or Firm*—Akin, Gump, Strauss, Hauer & Feld, LLP

(57) ABSTRACT

A network provides a method of virtualizing SCSI semantics onto a non-SCSI transport medium. The network includes a plurality of hosts or initiators, a SCSI bus coupled to a plurality of SCSI devices, and a bridge having a non-SCSI front end coupled to the non-SCSI transport medium and a SCSI back end coupled to the SCSI bus. The bridge provides firmware for performing various techniques for virtualizing certain SCSI semantics to ensure support (proper operation) of the plurality of SCSI devices. Examples of SCSI semantics for virtualizing SCSI-2 semantics onto a Fibre Channel interconnect medium (a non-SCSI-2 transport medium) include reserve/release support, unit attention support, the non-tagged command processing support for the initiators. Reserve/release support is virtualized by implementing virtual command responses to the RESERVE and RELEASE SCSI-2 command using a table for storing Fibre Channel world wide names (WWN) and the arbitrated loop address (ALPA) for the plurality of initiators. Virtual unit attention support is achieved by maintaining a list of initiators and status flags to determine when a unit attention condition needs to be sent to a particular initiator. When a combination of tagged and untagged commands is detected which would violate the rules for mixing such commands on the back-end SCSI bus, any command(s) that would result in the rule violation will be held within the bridge until the currently outstanding conflicting commands have completed.

66 Claims, 10 Drawing Sheets

U.S. PATENT DOCUMENTS

| | | | |
|---|---|---|---|
| 5,625,800 | | 4/1997 | Brayton et al. ................. 395/500.44 |
| 5,657,455 | | 8/1997 | Gates et al. ........................... 710/100 |
| 5,727,218 | * | 3/1998 | Hotchkin .............................. 710/260 |
| 5,802,394 | | 9/1998 | Baird et al. .............................. 710/5 |
| 5,812,754 | | 9/1998 | Lui et al. ................................. 714/6 |
| 5,845,154 | * | 12/1998 | Krakirian .............................. 710/74 |
| 5,848,251 | * | 12/1998 | Lomelino et al. ................... 710/129 |
| 5,867,648 | * | 2/1999 | Foth et al. ........................... 709/230 |
| 5,867,671 | * | 2/1999 | Adamson ............................ 710/126 |
| 5,892,955 | * | 4/1999 | Ofer .................................... 710/200 |
| 5,901,151 | | 5/1999 | Bieiweiss et al. .................. 370/480 |
| 5,925,119 | | 7/1999 | Maroney .............................. 710/126 |
| 5,925,120 | * | 7/1999 | Arp et al. ............................ 710/131 |
| 5,941,972 | * | 8/1999 | Hoese et al. ........................ 710/107 |
| 5,996,024 | * | 11/1999 | Blumenau ........................... 709/321 |
| 6,041,381 | * | 3/2000 | Hoese .................................. 710/129 |
| 6,044,442 | * | 3/2000 | Jesionowski ........................ 711/153 |
| 6,061,753 | * | 5/2000 | Ericson ............................... 710/107 |
| 6,073,209 | * | 6/2000 | Bergsten ............................. 711/114 |

OTHER PUBLICATIONS

American Standard of Accredited Standards for Information Systems, Fibre Channel—Physical and Signaling Interface (FC–PH) Rev. 4.3, ANSI®, Jun. 1, 1994, pp. 1–220.

American Standard of Accredited Standards Committee X3, X3.269–199X, Information Systems—dpANS Fibre Channel Protocol of SCSI, Revision 012, May 30, 1995, pp. 1–63.

Chan, Kurt, Fibre Channel Arbitrated Loop Direct Attach SCSI Profile (Private Loop), Version 2.0, Hewlett–Packard, Aug. 7, 1995, pp. 1–44.

Compaq Computer Corporation, WHITE PAPER, "Fibre Channel Technology: Understanding Fiber Cabling and Connecting to Building Infrastructure" First Edition Mar. 1998, 1998 Compaq Computer Corporation, pp. 1–10.

Compaq Computer Corporation and ECG Technology Communications, Technology Brief, "Compaq Fibre Channel Storage System Technology," Mar. 30, 1998, © 1998 Compaq Computer Corporation, pp. 1–16.

* cited by examiner

| DEVICE TABLE 300 |||||||||
|---|---|---|---|---|---|---|---|---|
| DEVICE ID 301 | DEVICE TYPE 302 | DEVICE NAME 303 | ERROR 304 | STATUS 305 | RES 306 | ALPA 307 | NODE NAME 308 | PORT NAME 309 |

World Wide Name (WWN) 310

| WORLD WIDE NAME TABLE 400 ||
|---|---|
| World Wide Name 401 | ALPA 402 |

FIG. 4

| VIRTUAL UNIT ATTENTION TABLE 500 |||
|---|---|---|
| ALPA 501 | Flag 502 | Flag Type 503 |

FIG. 5

SUPPORTING A SCSI DEVICE ON A NON-SCSI TRANSPORT MEDIUM OF A NETWORK

RELATED APPLICATIONS

This application is a continuation of U.S. patent application Ser. No. 09/070,955, filed May 1, 1998, now abandoned, which was a continuation-in-part of U.S. patent application Ser. No. 09/065,481 filed Apr. 24, 1998, entitled VIRTUALIZATION OF SCSI SEMANTICS ONTO A NON-SCSI TRANSPORT MEDIUM now abandoned.

BACKGROUND OF THE INVENTION

1. Field of the Invention

The present invention relates to storage support systems for storage area networks and more particularly to a system and method of virtualizing SCSI semantics from a host computer or server onto a non-SCSI transport medium of a storage area network.

2. Description of the Related Art

For the last couple of decades, the number of computer systems has grown exponentially and the capabilities of the average computer system to assimilate and process data has doubled every eighteen months. These two facts have created a spectacular rise in the demand for raw data storage capacity to support the growing capabilities of computers to assimilate and process data. The demand to add more data storage capability to computer networks, service more users, and provide data security in the form of data backup storage has been unrelenting. The trend in recent years has been to provide a separate data storage network, or storage area network (SAN), for storing data for a network of computers.

The primary advantage of a SAN is the ability of a group of computer users to pool their data without using a local area network (LAN) for tasks like transferring data files and providing backup of stored data files. For example, on a LAN when one station on the LAN generates a 500 MB video file, a second station can access the 500 MB video file if the first station simply transfers the read/write permissions for the video data file to the second station. A very large data file that might take hours to transfer on a LAN can be transferred to a SAN in minutes or seconds. The use of a SAN as opposed to a LAN frees valuable bandwidth on the LAN for client applications and provides scalability not found in the more traditional approaches to data storage such as connecting read/write servers directly to the LAN. Other advantages of a SAN configuration over a LAN configuration include computer clustering, topological flexibility, fault tolerance, high availability, and remote management. Because of the clear advantages of a SAN over a LAN, SAN approach to data storage has been implemented with success between a variety of high data access devices like file servers, backup servers, database servers, and shared storage arrays.

The primary storage interface for servers deployed in SAN systems is a parallel Small Computer System Interface (SCSI). While various forms of parallel SCSI's exist, the predominant form of parallel SCSI has been termed SCSI-2. SCSI-2 introduced enhanced SCSI device data transfer methodologies while maintaining the asynchronous transfer of data, instructions, and messages from earlier SCSI implementations.

Due to certain limitations inherent in a parallel SCSI, many designers of network systems are starting to turn from a traditional parallel SCSI to a non-SCSI transport medium such as a Fibre Channel interconnect medium. As computers and peripheral devices have continued to improve in performance capability, the limitations imposed by a parallel SCSI became apparent. Higher performance processors demanded higher throughput of the subsystem used to store data. A Fibre Channel interconnect medium has substantially addressed these concerns. A Fibre Channel interconnect medium has a serial interface which supports increased bandwidth, additional connectivity, longer distance operation, and greater flexibility.

Several topologies are defined for a Fibre Channel interconnect medium including Fabric, point-to-point, and the Arbitrated Loop. The Fabric topology is a switched connection that allows multiple pairs of devices to exchange messages simultaneously, creating a high aggregate bandwidth. The point-to-point topology is probably the simplest, consisting of a single connection between two devices. The most popular topology is the Arbitrated Loop (FC-AL) in which the out-bound cable of one device becomes the in-bound cable for the next, allowing for the connection of up to 126 devices at a time.

All of the topologies share a single coding scheme and framing protocol. A Fibre Channel interconnect medium currently sends information in frames containing a 24-byte header followed by up to 2118 bytes of data. At most, handshaking occurs after the transmission of every frame of data, unlike the synchronous transfer mode in a SCSI protocol in which a 'sender' is allowed to perform a fixed number of transfers before the 'sender' (target or initiator) stalls waiting for an acknowledgment. Like the traditional parallel bus SCSI protocol, every transaction has an initiator and a target and makes use of the SCSI command set semantics.

Current operating system environments are designed to be able to communicate with SCSI-2 devices attached via the traditional parallel SCSI bus. The SCSI-2 standard is currently in the process of being updated to produce a SCSI-3 standard. One of the key features of SCSI-3 is an attempt to separate the command protocol from dependencies on the physical interconnection medium, thus allowing for SCSI-3 command and data flow over a serial bus such as a Fibre Channel interconnect medium. Current operating system environments, however, have bene unable to handle many aspects of supporting a SCSI-3 device on a non-parallel bus because of the semantic differences between parallel and non-parallel busses. In addition, so far as is known, the notion of 'bridging' SCSI-2 servers across a serial bus environment or non-SCSI transport medium to SCSI-2 devices such as tape drives, storage medium changers, printers, scanners, optical memory devices, CD-ROM drives or hard disk drives is not provided for by an established or developing standard.

The first SCSI-3 devices available are likely to be SCSI-3 hard disk drives. Certain other devices which are available as SCSI-2 devices may not be offered as SCSI-3 devices for some time. Since Fibre Channel interconnect medium protocol (SCSI-FCP) is currently a SCSI-3 protocol, the use of Fibre Channel interconnect medium has precluded proper connectivity of SCSI-2 servers-command initiators to target SCSI-2 devices.

SUMMARY OF THE INVENTION

Briefly, the present invention provides a firmware system and method of virtualizing SCSI semantics SCSI server-command initiators onto a non-SCSI transport medium of a storage area network. A bridge having a non-SCSI front end and a SCSI back end provides firmware for virtualizing SCSI semantics onto a non-SCSI transport medium. Virtualization of the SCSI semantics permits the non-SCSI transport medium to support SCSI devices. A non-SCSI transport medium refers to a transport medium other than a traditional parallel interface. A non-SCSI front end refers to a front end of a bridge coupled to a non-SCSI transport medium.

In the disclosed embodiment, a storage area network having a Fibre Channel interconnect medium (a non-SCSI-2 transport medium) includes a plurality of hosts or initiators, a SCSI bus or plurality of SCSI busses coupled to a plurality of SCSI devices, and a bridge having a Fibre Channel front end coupled to the Fibre Channel interconnect medium and a SCSI-2 back end couples to the SCSI bus or plurality of SCSI busses. The bridge provides firmware for performing various techniques for virtualizing certain SCSI-2 semantics to ensure proper operation of a SAN using a SCSI-2 devices in a Fibre Channel interconnect medium. Examples of these SCSI-2 semantics include: (a) RESERVE/RELEASE support, (b) unit attention support, and (c) non-tagged command processing support for the initiators.

RESERVE/RELEASE support is virtualized by implementing virtual command responses to the RESERVE and RELEASE SCSI-2 commands. A World Wide Name data table stores the Fibre Channel word wide names (WWN) and the arbitrated loop addresses (ALPA) for the initiator nodes. When the bridge of the present invention receives the RESERVE command from an initiator, a reserve flag is set within a logical device record of a device table for the target unit or device to indicate that a reserve is in effect for the target. At login time, a check is made of the targets for reserve flags set to TRUE indicating an active reservation. The ALPA of any target with an active reservation is updated by locating the WWN and ALPA in the logical device record of a device table for the target. In this way, an initiator node is associated with the target the initiator reserved. When the bridge receives the RELEASE command from the initiator that provided the RESERVE command for the target, the reserve flag in the logical device record for the target is cleared.

A command to a target following a unit attention flag condition provided to an initiator clears the unit attention flag condition. Virtual unit attention flag support for other initiators is provided by maintaining a list of initiators and status flags in a virtual unit attention flag table to determine when a unit attention flag condition ends to be sent to an initiator. The list of initiators is searched to determine the state of the unit attention flags for the initiators. A unit attention flag condition is provided to the initiators having unit attention flags indicating the initiators require a unit attention flag condition. It is thereby determined which initiators need a unit attention flag condition even after a target device has cleared the unit attention flag condition.

Command queuing is implemented to virtualize the processing of non-tagged commands from the initiators. The firmware in the bridge detects if a command from an initiator to a SCSI device is tagged or untagged. If the command from the initiator is non-tagged, it is then detected when the SCSI device is processing a current command. If the SCSI device is processing a current command, issuance of the command is delayed until completion of the processing of the current command. After the delay, the command from the initiator is again presented to the SCSI device. Processing of the command as described above is repeated until the SCSI device is not processing a current command. If the SCSI device is idle such that the device is not processing a current command, the command from the initiator is issued to the SCSI device.

If the command from the initiator is tagged, it is detected whether the SCSI device is processing a non-tagged current command. IF the SCSI device is processing a non-tagged current command, issuance of the command from the initiator is delayed until completion of processing of the non-tagged current command. After the delay, the command from the initiator is again presented to the SCSI device. Processing of the command as described above is repeated until the SCSI device is not processing a non-tagged current command. If the SCSI device is not processing a non-tagged current command, the command from the initiator is issued to the SCSI device.

The present invention is particularly advantageous in that SCSI devices (e.g. SCSI-2 devices to include file servers, back up servers, database servers, shared storage arrays, tape drives, storage medium changes, printers, scanners, optical memory devices, CD-ROM Drives or hard disk drives) are support on a non-SCSI transport medium (e.g. Fibre Channel interconnect medium) in a multi-initiator environment.

BRIEF DESCRIPTION OF THE DRAWINGS

A better understanding of the present invention can be obtained when the following detailed description of the preferred embodiment is considered in conjunction with the following drawings, in which:

FIG. 3 is an illustration of an exemplary record entry in a device table stored in the Fibre Channel interconnect medium-to-SCSI-2 bridge of FIGS. 1 and 2 in accordance with the present invention;

FIG. 4 is an illustration of an exemplary record entry in a World Wide Name Data Table stored in the Fibre Channel interconnect medium-to-SCSI-2 bridge of FIGS. 1 and 2 in accordance with the present invention;

FIG. 5 is an illustration of an exemplary record entry in a virtual unit attention table stored in the Fibre Channel interconnect medium-to-SCSI bridge of FIGS. 1 and 2 in accordance with the present invention;

DETAILED DESCRIPTION OF THE PREFERRED EMBODIMENT

Figure 1:
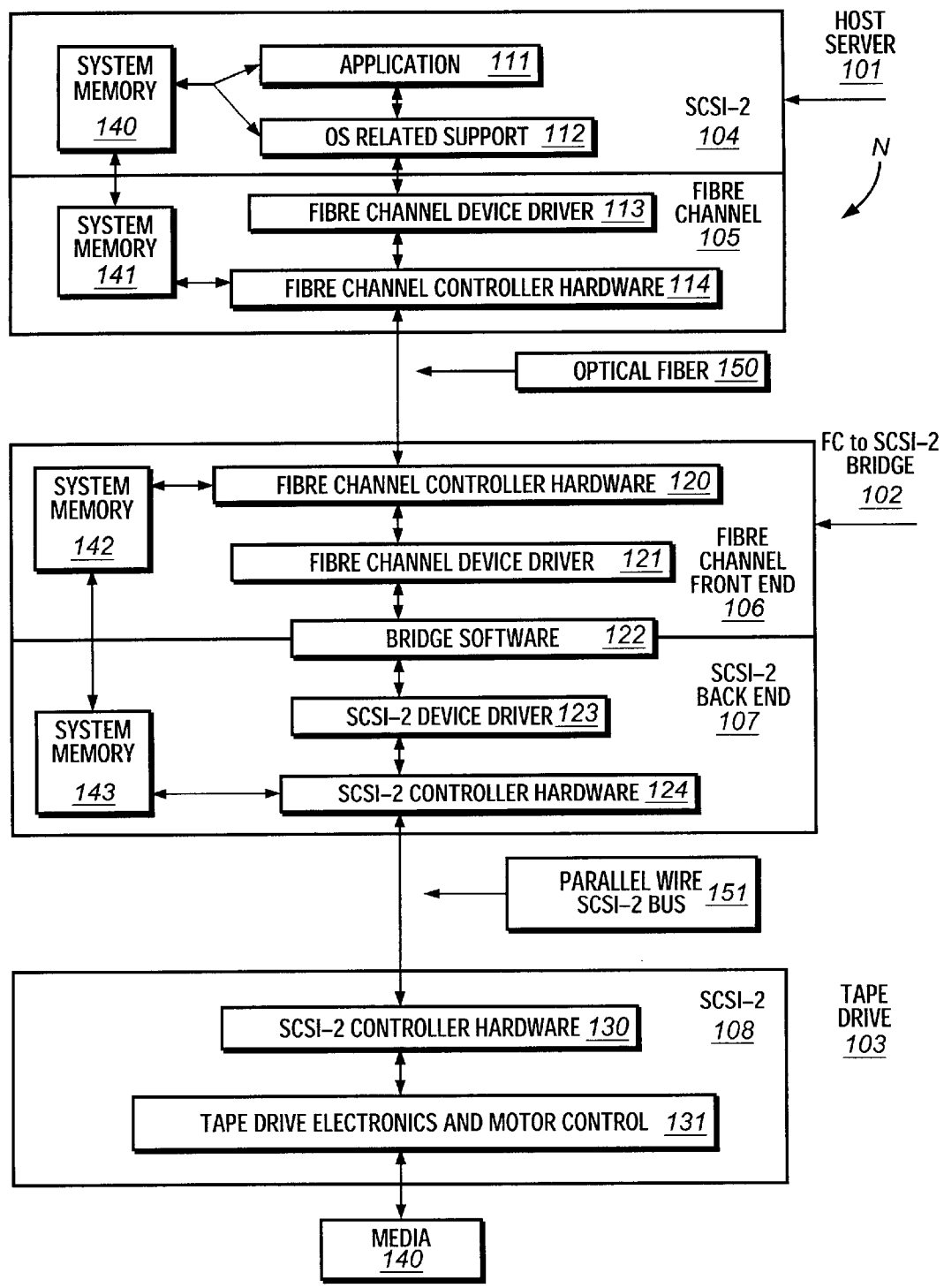
FIG. 1 is a block diagram of a computer network including a host server, a Fibre Channel interconnect medium-to-SCSI-2 bridge and a SCSI-2 compatible tape drive in accordance with the present invention.

Turning to FIG. 1, illustrated is a computer network N in which the techniques according to the present invention can be implemented. The network N in the illustrated embodiment includes a host server 101, a Fibre Channel interconnect medium-to-SCSI-2 bridge (FC-SCSI-2) 102 (FIGS. 1, 2 and 12) and a SCSI-2 tape drive 103. It should be noted that alternatively the network N may include a plurality of host servers and a plurality of SCSI-2 devices such as file servers, backup servers, database servers, and shared storage arrays. The FC-SCSI bridge 102 generally serves to provide data and commands between the host server 101 and the tape drive 103. In accordance with the present invention, this exemplary hybrid SCSI-2 and Fibre Channel architecture supports SCSI-2 devices. The network N in accordance with the present invention allows a computer user with an investment in an SCSI-2 operating system, software, and peripheral devices to transparently obtain the advantages of SAN architecture including a Fibre Channel interconnect medium technology without the need to upgrade to SCSI-3 devices. A SAN architecture including a Fibre Channel interconnect medium for supporting SCSI-2 devices is particularly advantageous since certain peripheral devices, which are not available in a SCSI-3 version, are available as SCSI-2 devices. It should be understood that a variety of network configurations including a Fibre Channel interconnect medium-to-SCSI-2 bridge are possible.

The host server 101 is divided into a SCSI-2 portion 104 and a Fibre Channel portion 105 (FC). Both application 111 and related software operating system-related support software 112 (OSRS) are software components within the SCSI-2 portion 104 of the host server 101. The Fibre Channel portion 105 is transparent to the application related software 111 and to the OSRS 112. In addition, both the application related software 111 and the OSRS 112 are contained within a system memory 140.

The Fibre Channel portion 105 of the host system 101 includes a Fibre Channel device driver 113 (FCD) and Fibre Channel controller hardware 114 (FCCH), each of which has access to a system memory 141. The FCD 113 is the interface between the FCCH 114 and the OSRS 112. The FCCH 114 has access to the OS-related support software 112 in system memory 140 through the FCD 113. Design and operation of Fibre Channel controller hardware 114 is understood in the art. While the FCD 113 and FCCH 114 portions of the host system 101 comprehend SCSI-3 Fibre Channel Protocol (SCSI-3-FCP), a type of SCSI-FCP protocol, the application related software 111 and the OSRS 112 comprehend only the SCSI-2 protocol. The SCSI-FCP protocol is described in the Fibre Channel Protocol for SCSI, American National Standard, X3.269-199X, Revision 012, May 30, 1995, and the Fibre Channel Arbitrated Loop Direct Attach SCSI Profile, Kurt Chan, Hewlett-Packard, Version 2.0, Aug. 7, 1995, both of which are incorporated by reference as if set forth in their entirety.

Connected to the FCCH 114 is a corresponding FCCH 120 in the FC-SCSI-2 bridge 102. In this diagram, the FCCH 114 and FCCH 120 are connected by a non-SCSI transport medium, specifically a Fibre Channel interconnect medium or "fabric" 150. In the context of the present invention, the term "fabric" refers to any Fibre Channel interconnection entity. This interconnect medium 150 is preferably a fiber optic cable, but in another embodiment could easily be a twisted pair or a coaxial cable. The Fibre Channel protocol and interconnect medium are described in Fibre Channel—Physical and Signaling Interface (FC-PH), Computer and Business Equipment Manufacturers Association, Jun. 1, 1994, which is hereby incorporated by reference as if set forth in its entirety. Like the FCCH 114 in the host server 101, the FCCH 120 of the FC-SCSI bridge 102 is connected to a FCD 121. In this case, the FCD 121 provides an interface between the FCCH 120 and the bridge software 122. The bridge software 122 manages communication of data and commands between a Fibre Channel front end 106 (FCFE) and a SCSI-2 back end 107 (S2BE). As described below, in accordance with the present invention, the bridge software 122 performs techniques for virtualizing certain SCSI-2 semantics for properly supporting SCSI-2 devices.

In a similar fashion to the Fibre Channel front end 106, the S2BE 107 includes a SCSI-2 device driver 123 (S2D) and SCSI-2 controller hardware 124 (S2CH). The FCCH 120 and the S2CH 124 have access respectively to a system memory 142 and a system memory 143. The SCSI-2 device driver 123 is contained within the system memory 143, and the Fibre Channel device driver 121 is contained within the system memory 142. The bridge software 122 may be contained within the system memory 142 or the system memory 143.

Connected to the FC-SCSI bridge 102 is a SCSI-2 device 108, such as a tape drive 103. The tape drive 103 is illustrative of a SCSI-2 device; the SCSI-2 device 108 can be any SCSI-2 sequential access device (direct connect or otherwise) such as a medium-changer, printer, scanner, optical memory device, CD-ROM device, or hard disk drive. In this example, a SCSI-2 controller 130 controls a conventional tape drive electronics and motor control unit 131 (TDEMC). Also illustrated is media 140 which in this illustration of a tape drive 103, would probably be a removable tape. In the example of a CD-ROM drive, the media 140 would be a compact disc (CD). Design and operation of SCSI-2 controller hardware 130 is understood in the art. SCSI-2 protocol and devices are described in Information Technology—Small Computer System Interface-2, Computer & Business Equipment Manufacturer Association, Mar. 20, 1994, which is hereby incorporated by reference as if set forth in its entirety.

Figure 2:
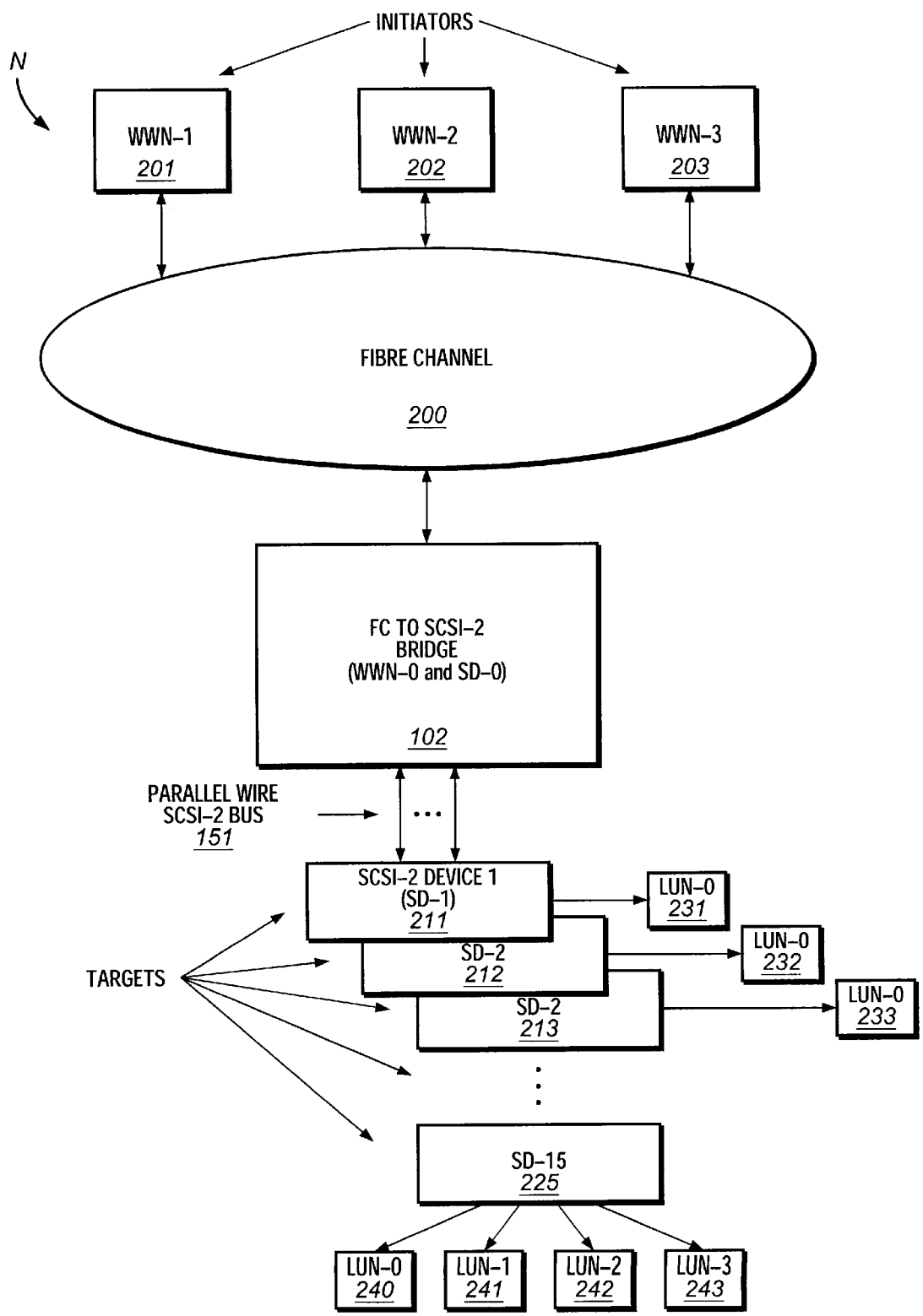
FIG. 2 is a block diagram of the computer network of FIG. 1 including the Fibre Channel interconnect medium, a plurality of initiators connected to the Fibre Channel interconnect medium, a Fibre Channel interconnect medium-to-SCSI-2 bridge, and a plurality of SCSI-2 devices.

Turning to FIG. 2, illustrated is the Fibre Channel network N including a parallel wire SCSI bus 151 coupled to a plurality of SCSI-2 devices 211–225 preferably shared by a plurality of host servers 201–203. It should be understood that the network N may provide one or a plurality of parallel wire SCSI busses 151. In the Fibre Channel environment, each device on the non-SCSI Fibre Channel has a World Wide Name (WWN), assigned by the manufacturer, which uniquely identifies the device with respect to any other Fibre Channel device. In the SCSI-2 environment of the network N, devices are named with respect to the particular SCSI bus 151 to which the devices are connected. SCSI-2 devices are typically on a SCSI bus for supporting sixteen devices. For example, each device may be assigned an identification number from 0 to 15 that uniquely identifies the device. In addition, each position on the SCSI bus 151 can be mapped to a plurality of logical units, or LUN's. In both the Fibre Channel and the SCSI-2 environments, devices that originate device service requests and task management functions are referred to as "initiators" and the devices that receive these requests are referred to as "targets." In the disclosed embodiment, the Fibre Channel devices (host servers, for example), WWN-1 201, WWN-2 202, and WWN-3 203 are initiators and the SCSI-2 devices SD-1 through SD-15, 211–225 respectively, are targets. The FC-SCSI-2 bridge 102 serves as a target on the Fibre Channel interconnect medium 200 and an initiator on the SCSI 2 bus 151. It should be understood that each device on the Fibre Channel interconnect medium 200 or the SCSI bus 151 may serve as a target, initiator, or both a target and an initiator.

The Fibre Channel interconnect medium 200 is further connected to the FC-SCSI-2 bridge 102. To the Fibre Channel environment, the FC-SCSI-2 bridge 102 is viewed as any other device on the Fibre Channel interconnect medium 200. In the disclosed embodiment, the FC-SCSI-2 bridge 102 is assigned a World Wide Name, WWN-0, that uniquely identifies the bridge 102 on the Fibre Channel interconnect medium 200.

Connected to the FC-SCSI-2 bridge 102 is the parallel wire, single-ended and differential SCSI-2 bus 151. In the disclosed embodiment, the SCSI-2 bus 151 is connected upstream to the FC-SCSI-2 bridge 102 and downstream to a plurality of SCSI-2 devices (SD-1-SD-15) 211–225. For simplicity, SD-4 214 through SD-14 224 are not shown. The FC-SCSI-2 bridge 102 is viewed as any other device on the SCSI bus 151. The FC-SCSI-2 bridge 102 is uniquely assigned its SCSI bus identifier, SD-0. While the Fibre Channel interconnect medium 200 of the FC-SCSI-2 bridge 102 is a Fibre Channel device with a World Wide Name, WWN-0 to the SCSI-2 bus 151 the FC-SCSI-2 bridge 102 is a SCSI-2 device with a SCSI identifier SD-0.

Each SCSI-2 device is capable of being subdivided into up to eight logical units (LUNs). In the disclosed embodiment, logical units LUN-0 240, LUN-1 241, LUN-2 242, and LUN-3 3243 are illustrated for SCSI-2 device SD-15 225, and logical units LUN-0 231, LUN-0 232, and LUN-0 233 are illustrated respectively for SCSI-2 devices SD1–SD3 (211–213). Command or data from an initiator may be specifically directed to a logical unit or set of logical units of a SCSI-2 device.

In a traditional SCSI environment, one SCSI server-command initiator device owns the SCSI bus at any one time. Since a SCSI server-command initiator must traverse an arbitration phase to gain access to the SCSI bus, a SCSI target device upon receipt of a command from a SCSI initiator device is aware of the owner of the SCSI bus. A SCSI target device thus is aware of the SCSI device that initiated the command provided to the SCSI target device. In a Fibre Channel/SCSI-2 environment, however, a SCSI-2 device hind a Fibre Channel-to-SCSI-2 bridge is unaware if the command comes from the originating sever-command initiator or Fibre Channel initiator of virtual commands provided to the SCSI-2 device.

A Fibre Channel/SCSI-2 environment generally refers to a network including a Fibre Channel interconnect medium coupled to a SCSI-2 bus through a Fibre Channel-to-SCSI-2 bridge. When a command or request from a host server is directed through the FC-SCSI-2 bridge 102 to be serviced by a SCSI-2 target device, the SCSI-2 target device perceives the command as originating with the FC-SCSI-2 bridge 102 as opposed to the host server. The SCSI-2 target device only perceives devices within the SCSI-2 environment; therefore, information is lost as to the Fibre Channel initiator that is communicating with the SCSI-2 target device. The capability of determining an originating initiator of a request is necessary in a Fibre Channel/SCSI-2 multi-initiator network environment. Without this capability, a Fibre Channel/SCSI-2 environment cannot provide the SCSI-2 semantics necessary for proper operation of SCSI-2 devices in a multi-initiator setting. In the disclosed embodiment, for example, if a request is initiated by the Fibre Channel device WWN-1 201 intended to be serviced by the target SCSI-2 device SD-1 211, then the SCSI-2 device SD-1 211 can only determine that the request was initiated by the FC-SCSI-2 bridge 102.

An example of a SCSI-2 command where this problem is seen is the SCSI-2 Reserve command. In the disclosed embodiment, the initiator WWN-1 201 may send a Reserve command to the target device DS-1 211. Since the Reserve command is provided to the target device SD-1 211 through the FC-SCSI-2 bridge 102, the SCSI-2 identifier detected by the target device 501 is SD-0. If the target device SD-1 211 then receives another request, the target device SD-2 211 must check the SCSI-2 identifier to ensure that the request originated from the initiator WWN-1 201. Even if this request is from the initiator WWN-2 202, the SCSI-2 identifier detected by the target device SD-1 is SD-0. Since this is the same identifier that the target device SD-1 211 associates with the initiator WWN-1 201, the target device SD-1 cannot determine whether the request came from the initiator WWN-1 201 or the initiator WWN-2 202. While this example has been with respect to a request from the initiator WWN-1 201 and a request from initiator WWN-2 202, it should be understood that this problem is applicable to request from any Fibre Channel initiators.

RESERVE/RELEASE SUPPORT

Loop Login Process

Figure 6:
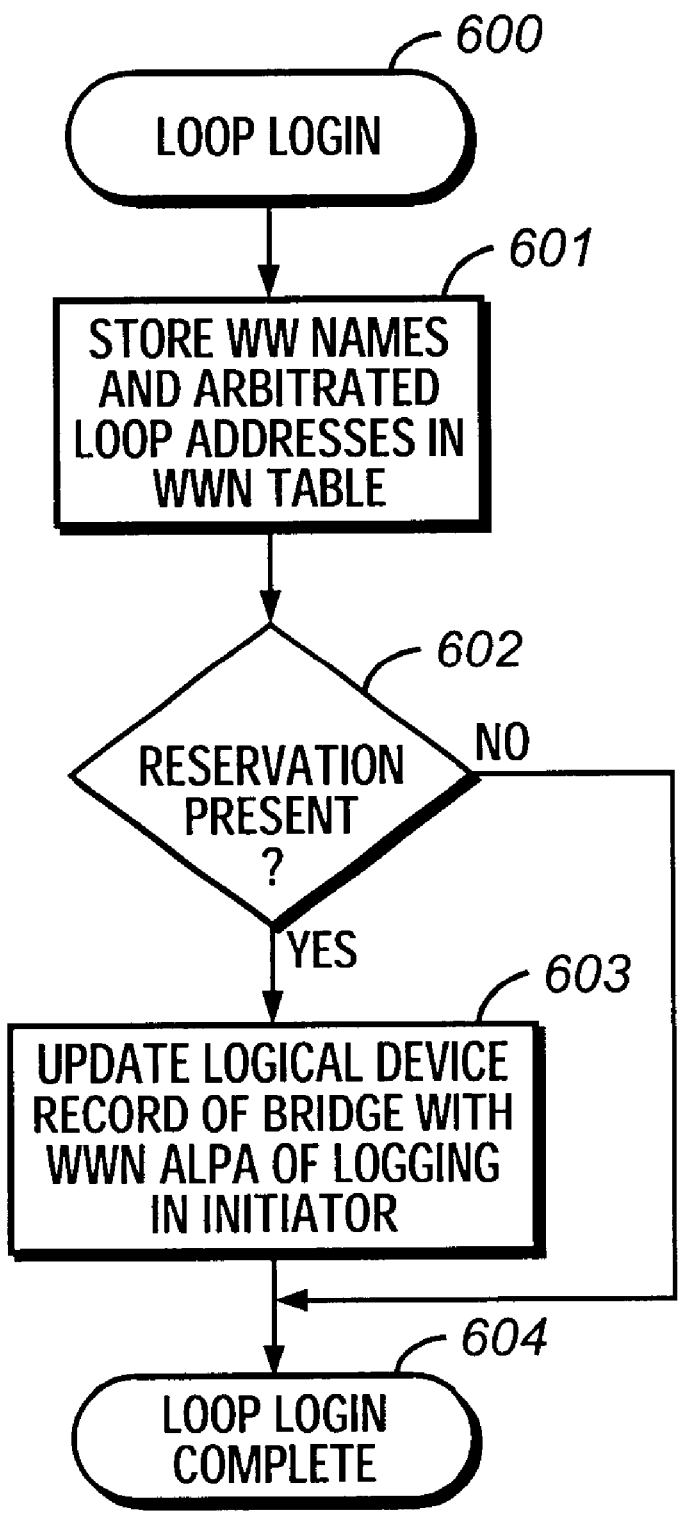
FIG. 6 is a flow chart of the initialization process for the software portion of the present invention stored in the Fibre Channel interconnect medium-to-SCSI-2 bridge of FIGS. 1 and 2.

Turning now to FIG. 6, a flow chart shows a loop login process 600 of the present invention. The loop login process 600, which is executed by the bridge software 122, represents the initialization for the RESERVE/RELEASE support described below. In step 601, when the Fibre Channel network N is powered on, the bridge software 122 fills a data table termed the World Wide Name table (WWN) 400 (FIG. 4) with a unique identifier, such as a World Wide Name (WWN), for each initiator along with its arbitrated loop address (ALPA). The ALPA is a "handle" or "nickname" used in a Fibre Channel loop environment for the addressing of targets and initiators without having to use the much longer WWN. Next, in step 602, it is determined whether a reservation is present by checking a reservation flag for each target. If a reservation is not present, control terminates through step 604, completing the loop login process. If a reservation is present, a logical device record of the bridge 102 is updated with the ALPA of the initiator logging in. Circumstances for which an ALPA may change include the addition, the relocation, and the removal of Fibre Channel devices, some of which will be initiators. The loop login process thus generates a mechanism for uniquely identifying multiple initiators of commands to target SCSI-2 devices on a continuous basis.

Virtualization Process

Figure 7:
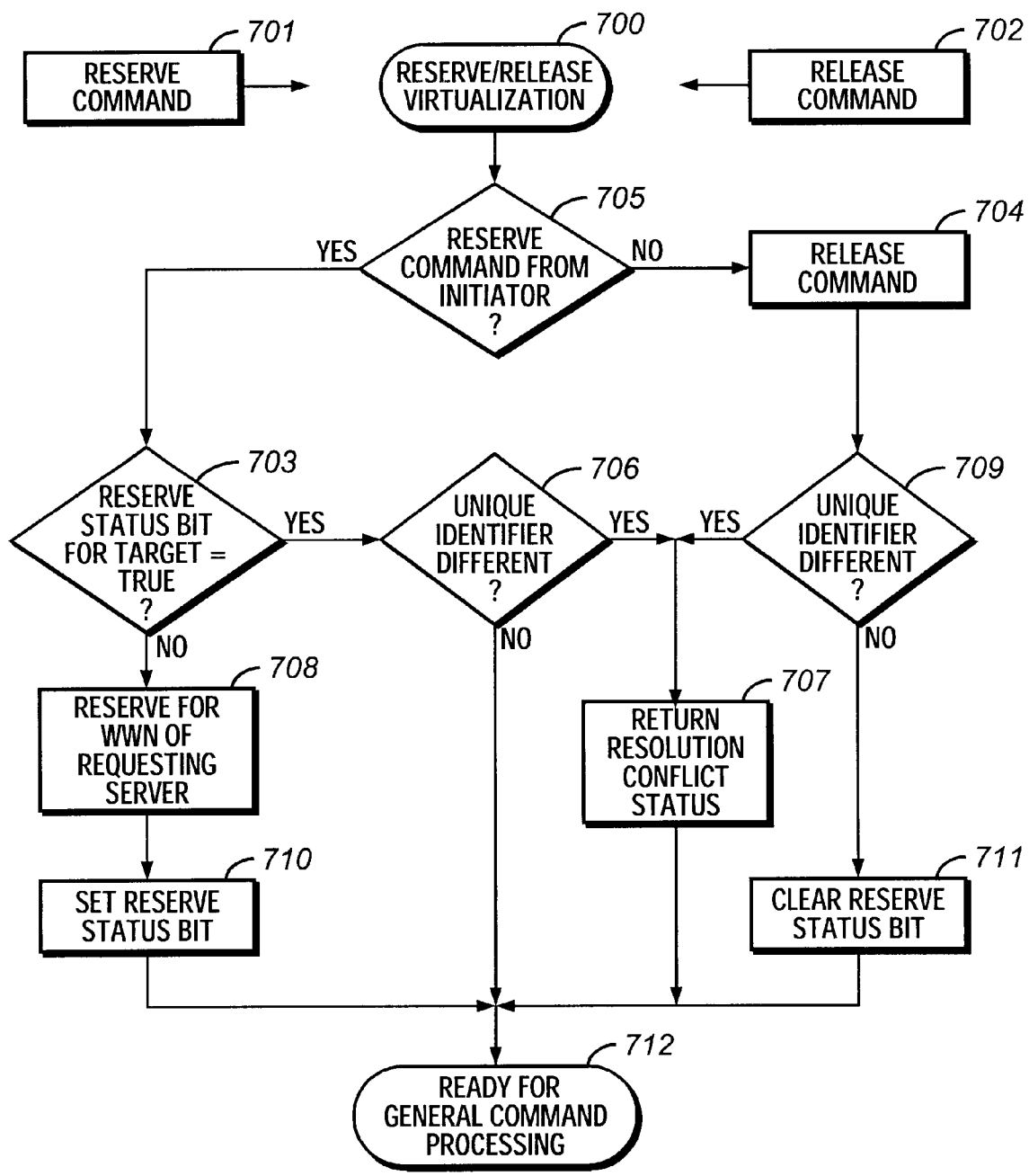
FIG. 7 is a flow chart of the virtualization process for supporting SCSI-2 RESERVE and RELEASE commands in accordance with the initialization process of FIG. 6 and performed by the software portion of the present invention stored in the Fibre Channel interconnect medium-to-SCSI-2 bridge of FIGS. 1 and 2.

Turning now to FIG. 7, a flow chart shows the virtualization support for SCSI-2 RESERVE/RELEASE commands on a Fibre Channel network N in accordance with the present invention. Since the parallel wire SCSI-2 bus 151 (FIG. 1) cannot identify a particular Fibre Channel initiator when a command is forwarded across the FC-SCSI-2 bridge 102, the FC-SCSI-2 bridge 102 must process the command in a manner that recreates, or virtualizes, the SCSI-2 RESERVE/RELEASE support. A RESERVE command permits an initiator to claim exclusive ownership of a logical unit or LUN, and a RELEASE command permits an initiator to release exclusive ownership of a logical unit or LUN.

Certain tables stored within the FC-SCSI-2 bridge 102 are used in implementing the virtualization process. FIG. 3 shows a single record entry of a device table 300 for a target device. The data fields of the record include a Device ID field 301, a Device Type field 302, a Device Name field 303, an Error field 304, a Status field 305, a Res field 306, an ALPA field 307, a Node Name field 308, and a Port Name field 309. The Device ID field 301 stores an identifier for a particular device. The Device Type field 302 stores a device type for a particular device. The Device Name field 303 stores a device name for a particular device. The Error field 304 stores an error code for a particular device. The Status field 305 stores a status code for a particular device. The Res field 306 stores a reservation flag for a particular device. The ALPA field 307 stores an arbitrated loop address for a particular device. The Node Name field 308 stores a node name for a particular device. The Node Name is the World Wide Name for a device. The Port Name field 309 stores a port name for a particular device. The Port Name field 309 is derived from the World Wide Name (or Node Name field 308) for a device and is used to differentiate among a potential plurality of ports on a device. In certain situations, both the port name and node name are needed to identify a Fibre Channel device. In other situations, the node name is sufficient to identify a Fibre Channel device. Conventional SCSI-2 protocol has provided the Device ID field 301, Device Type field 302, Device Name field 303, Error field 304, and Status field 305. It should be understood that other conventional device data fields may also be provided.

In accordance with the present invention, four fields, the Res field 306, the ALPA field 307, the Node Name field 308, and the Port Name field 309, indicated schematically by 311, are provided. The bridge software 122 implements two tables with the format of the device table 300, a Logical Device Table (LDT) and a Physical Device Table (PDT). In the disclosed embodiment, the LDT is accessed in performing the RESERVE/RELEASE virtualization process described below.

FIG. 4 shows a single record entry of the WWN Table 400. The data fields of the WWN table 400 include a World Wide Name (WWN) field 401 and an Arbitrated Loop Address (ALPA) field 402. Every Fibre Channel device is assigned a unique WWN by its manufacturer and the WWN of each device connected to the Fibre Channel interconnect medium 200 is stored in the WWN field 401 of the WWN table 400. As discussed above, the WWN table 400 is populated with data during the initialization process of FIG. 6.

Turning now to FIG. 7, the flow chart shows the RESERVE/RELEASE virtualization process 700 in accordance with the present invention. If a RESERVE command 701 is received, then the RESERVE command 701 is detected in step 705. From step 705, control proceeds to step 703 where the state of the reserve status bit (Res) is tested. The test in step 703 is performed by locating a data entry record in the LDT and checking the Res field 306 (FIG. 3) to determine whether the target device is reserved. If the target device is reserved, then the Res field 306 stores a TRUE value. If a target device is not reserved, then the Res field 306 stores a FALSE value. If the target device is not reserved, then the WWN of the initiator is copied into the WWN field 310 of the LDT in step 708. Next, in step 710, the Res field 306 of the data entry record is set to indicate that the requested device is now reserved. From step 710, control proceeds to step 712 where the process is ready for general command processing.

Operation

If, in step 703, the Res field 306 of the data entry record is set to reserved, then the bridge soft ware 122 in step 706 determines whether the ALPA contained within the ALPA field 402 of the World Wide Name table 400 matches the ALPA contained within the ALPA field 307 of the data entry record. If the ALPA fields match, the initiator that is sending the RESERVE command 701 is the same initiator which reserved the target device. Processing therefore can proceed to step 712 where the process is ready for general command processing. If the ALPA field 402 of the World Wide Name table 400 of the initiator and the ALPA field 307 of the LDT do not match, a Reservation Conflict Status 707 is returned. Control then proceeds to step 712 for general command processing.

Returning to step 705, if the RELEASE command 702 is received, control proceeds through step 705 where it is determined that a reserve command was not provided and step 704 where the RELEASE command 702 is detected. From step 704, it is determined in step 709 if the WWN field 310 of the data entry record matches the WWN field 401 in the World Wide Name table 400 of the initiator. If so, control proceeds to step 711 where the Res field 306 of the data entry record is cleared. Other methods for clearing a reservation also are possible, such as a reset of the bridge 102. A reset of the bridge 102 may be a power cycle initiated by hand or accident or may be a response to a reset imperative received from an initiator. In traditional SCSI-2, the reset imperative is either a hard bus reset signaled by a line on the SCSI-2 bus or a "Bus Device Target Reset" message. In a Fibre Channel/SCSI environment, the reset imperative is a TARGET_RESET task control. From step 711, control proceeds to step 712. If, in step 709, the WWN field 310 of the device record does not match the WWN field 401 of the World Wide Name table 400, a Reservation Conflict Status is returned in step 707. From step 707, control passes to step 712.

Modifications

Virtualization of RESERVE/RELEASE support as described above may be modified in a number of ways without departing from the spirit of the invention. For instances, in an alternative embodiment, whether the ALPA fields 307 and 402 match may be determined before determining whether a received command is a RESERVE command 701 or a RELEASE command 702. In another embodiment, a unique identifier check 706 may be performed before a reserve status bit (Res) check 703. In yet another embodiment of the process, World Wide Name fields, rather than ALPA fields, may be compared for detecting a reservation conflict. It should be understood that resolution of a reservation conflict may be performed using any unique identifier for devices on a Fibre Channel medium.

General Command Handling

Figure 8:
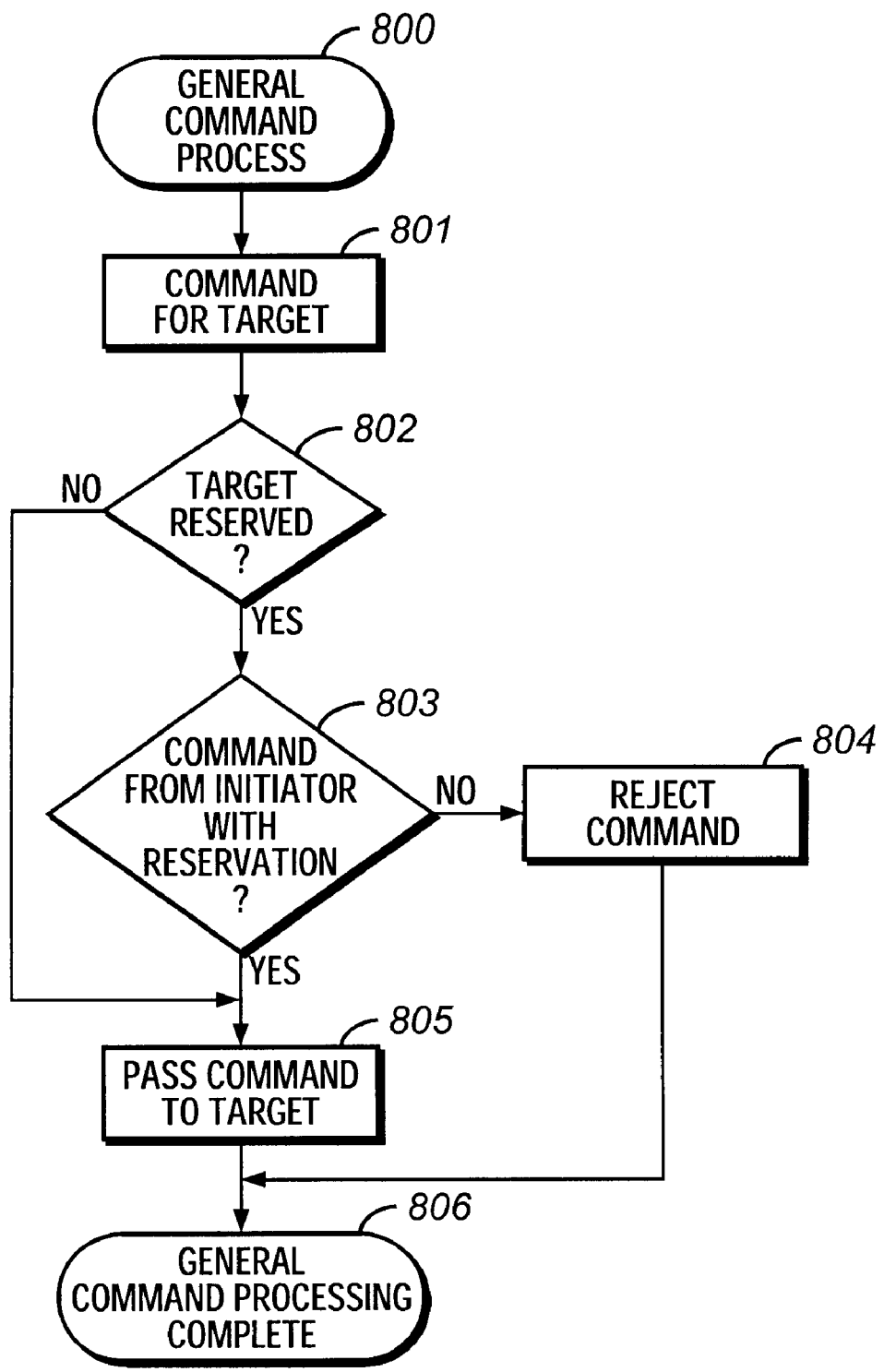
FIG. 8 is a flow chart of general command handling process in accordance with the virtualization process of FIG. 7.

Turning now to FIG. 8, a flow chart shows a general command handling process in accordance with the present invention. This flow chart represents a reservation checking process which the bridge software 122 executes when the FC-SCSI-2 bridge 102 receives a general command directed to a target device. In the context of the present invention, a general command refers to any command for which reservation checking would be desirable. A general command may, for example, be a read or write command. The general command process 800 begins at step 801 where a command for the target device is passed from an initiator to the FC-SCSI-2 bridge 102. In step 802, the process determines whether the command is addressed to a target that has been reserved by a RESERVE command 701 from an initiator. If the target has not been reserved, then the command is passed to the target in step 805 From step 805, processing of the command is completed in step 806.

If the target device has been reserved in step 802, control proceeds to step 803 where it is determined if the initiator of the command matches the initiator which reserved the target. If the initiator of the command matches the initiator with the reservation, then the command is passed to the target in step 805. Next, processing of the general command is complete in step 806. If the initiator of the command does not match the initiator that reserved the target device, then the command is rejected in step 804. At step 804, an error code may be returned to the initiator which sent the general command. This general command handling process in combination with the above described processes achieves virtualization of the SCSI-2 RESERVE/RELEASE command semantics.

COMMAND QUEUING

Figure 9:
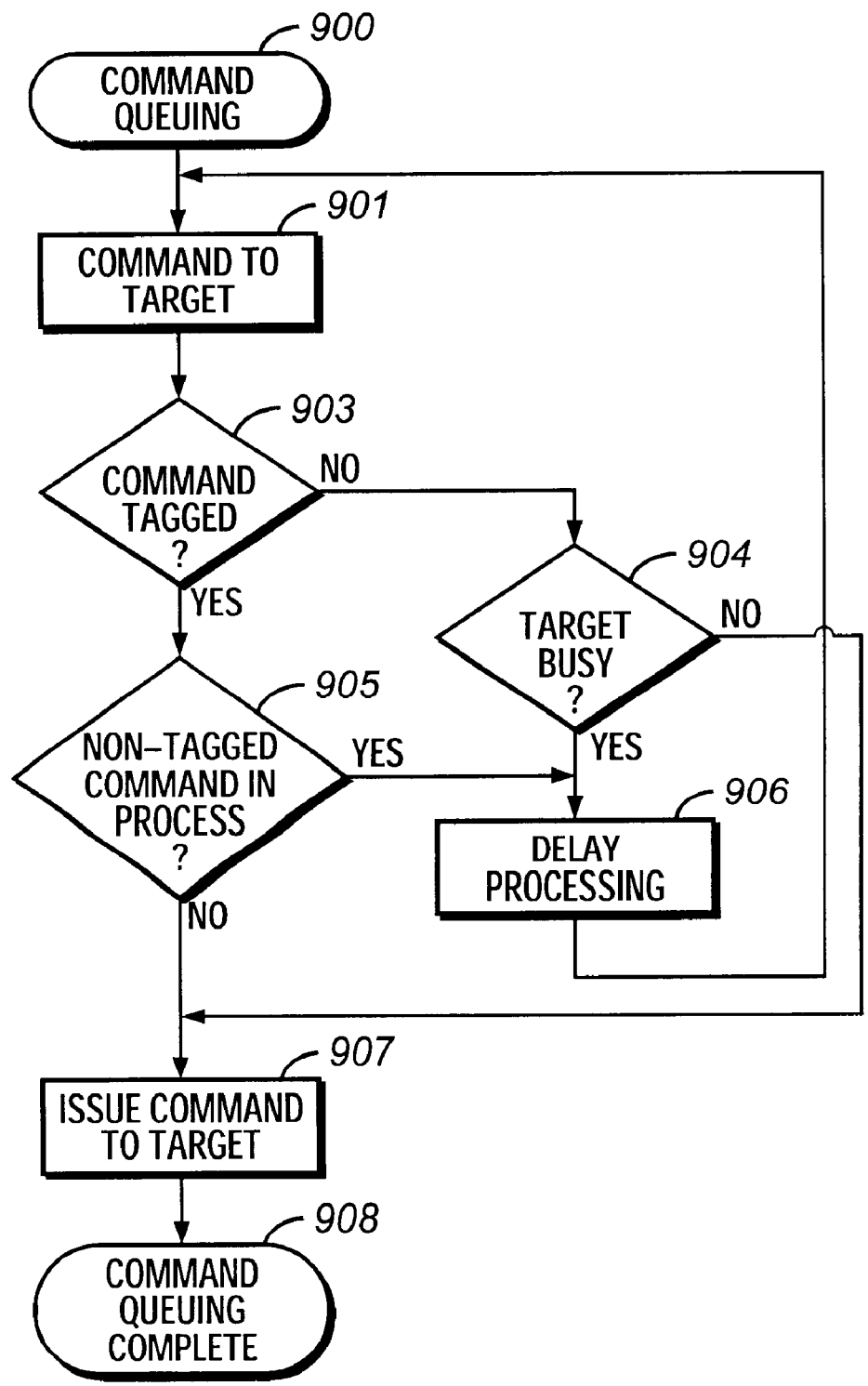
FIG. 9 is a flow chart of the command queuing process for virtualizing tagged and untagged command processing in accordance with the present invention and performed by software stored in the Fibre Channel interconnect medium-to-SCSI-2 bridge of FIGS. 1 and 2.

Turning now to FIG. 9, a flow chart shows a command queuing processing 900 for virtualizing processing of non-tagged commands from Fibre Channel initiators in accordance with the present invention. A SCSI-2 device inherently cannot accept more than one non-tagged command from a single initiator at any one time. In other words, overlapping non-tagged commands are not allowed from a single initiator. Also, non-tagged commands and tagged commands from a single initiator are not allowed.
Processing of Non-tagged Commands In accordance with the present invention, processing of non-tagged commands from Fibre Channel initiators is virtualized. When a combination of tagged and non-tagged commands is detected which would violate the rules for mixing such commands on the SCSI-2 back-end 107, and command(s) that would result in a rule violation are held within the bridge software 122 until the currently outstanding conflicting commands have completed. These rules are discussed in section 6.8 of Information Technology—Small Computer System Interface-2, Computer & business Equipment Manufacturer Association, Mar. 20, 1994.

The process 900 begins at step 901 where a command to a target device is received into the bridge. Next, in step 903, the bridge software 122 in the FC-SCSI-2 bridge 102 determines whether the command is a tagged command. If the command is a tagged command, then the process proceeds to step 905 where the bridge software 122 determines whether there is a non-tagged command in process. If there is not a non-tagged command in process, then the command is issued to the target in step 907. From step 907, the command queuing process is completed in step 908.

Returning now to step 903, if the received command is non-tagged, then the process proceeds to step 904 where it is determined whether the target device is busy processing another request. If the target is idle and therefore not busy processing a request, control proceeds to stop 907 where the command is issued to the target. From step 907, control proceeds to step 908 where the process is complete. If the target is busy in step 904, then the command is delayed in step 906 and then resubmitted for processing in step 901.

Processing of Tagged Commands

If a command has been determined to be tagged in step 903 and a non-tagged command has been determined to be in process in step 905, then the command is also delayed in step 906 and resubmitted for processing in step 901. The process thus only reaches issuance of the command under two conditions. The first condition is when a command is non-tagged and the target is idle. The second condition is when a command is tagged and the target is either idle or only other tagged commands are in process. Until these two conditions are met, the process continues to delay processing and resubmit a command.

UNIT ATTENTION FLAG SUPPORT

Figure 10:
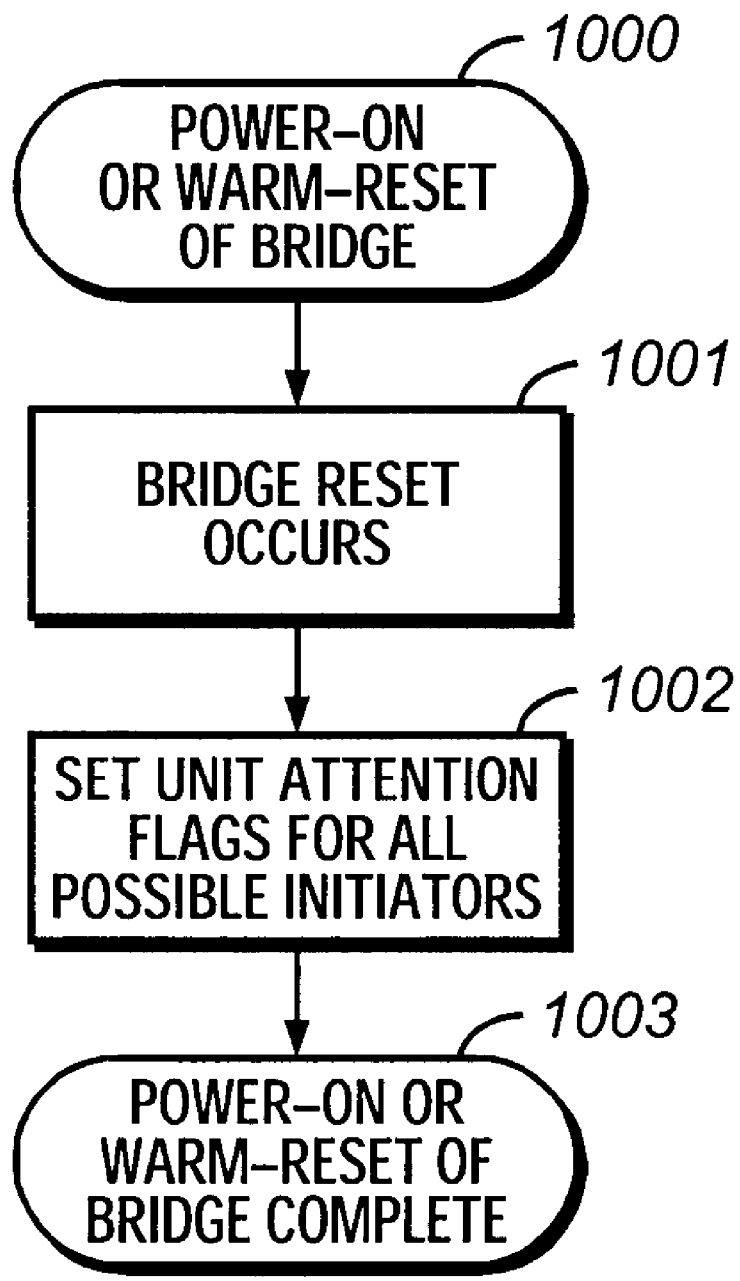
FIG. 10 is a flow chart of a power-on or warm reset of bridge process performed by the software stored in the Fibre Channel interconnect medium-to-SCSI-2 bridge of FIGS. 1 and 2 and using the virtual unit attention flag table of FIG. 5 in accordance with the present invention.
Figure 11:
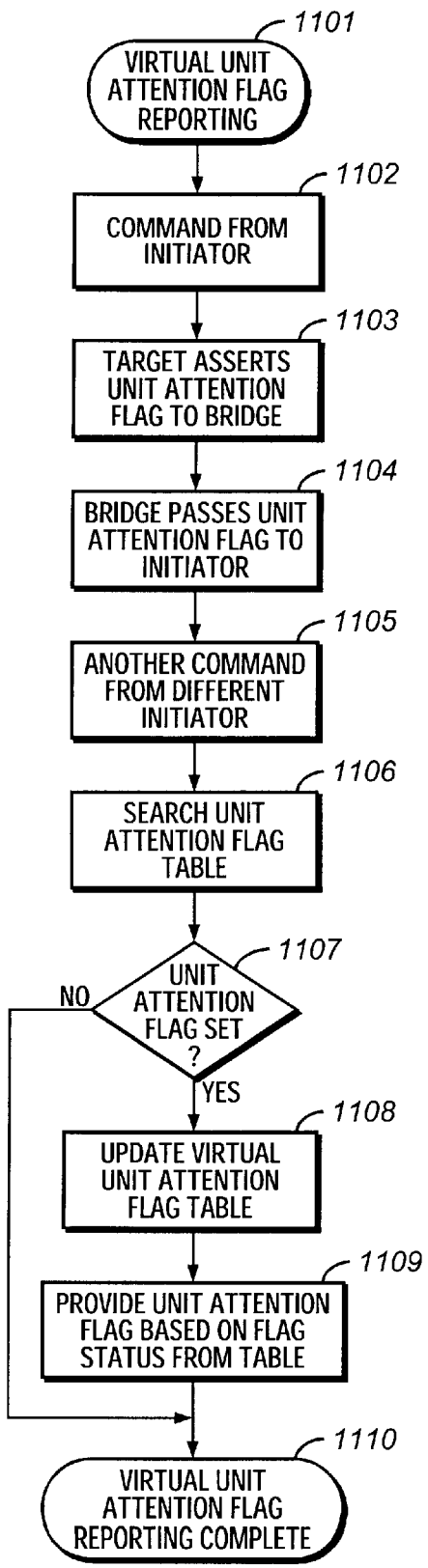
FIG. 11 is a flow chart of a virtual unit attention reporting process performed by software stored in the Fibre Channel interconnect medium-to-SCSI-2 bridge of FIGS. 1 and 2 and using the virtual unit attention table of FIG. 5 in accordance with the present invention.

Referring to FIG. 10, a power-on or warm-reset of bridge process 1000 is shown in accordance with the present invention. Beginning in step 1001, a bridge reset occurs. Next, control proceeds to step 1002 where unit attention flags of the Virtual Unit Attention Table 500 (VUAT) (FIG. 5) are set for all possible initiators are set. From step 1002, control terminates through step 1003. It should be understood that this virtualization process applies to events other than SCSI bus resets capable of generating a unit attention flag without first receiving a command sequence.
Process Turning now to FIG. 11, a flow chart shows a virtual unit attention reporting process 1101 in accordance with the present invention. Beginning in step 1102, a command is received from an initiator. Next, in step 1103, a target asserts a unit attention flag to the bridge 102. Examples of events which may trigger a unit attention flag are a target device reset and a removed media 140. At step 1104, the bridge 102 passes the unit attention flag to the particular initiator that originated the command. At the same time, the bridge software 122 updates each entry in the VUAT 500. The table 500 stores an ALPA for any possible initiator of a target. An exemplary data record from the VUAT 500 is displayed in FIG. 5. The fields in the VUAT 500 include the Arbitrated Loop Address (ALPA) field 501 for initiators on the Fibre Channel fabric 200, a Flag field 502 which indicates whether a unit attention flag condition has occurred, and a Flag Type field (503) which indicates the type of unit attention flag if the flag field 502 is actually set. In the disclosed embodiment, three possible unit attention flag types are supports: power on, media removal, and calibration.

Proceeding next to step 1105, a command is received from a different initiator than the initiator that originated the previous command to the target device. In step 1106, the VUAT 500 is searched to determine whether there is a unit attention flag for the target device. If not, as shown in decision step 1107, the virtual unit attention reporting is complete at step 1110. If the bridge software 122 determines the virtual unit attention flag is set in the VUAT 500 for the target device, the VUAT 500 is updated in step 1108 to indicate that the initiator is ready to service the unit attention flag condition. Based on the state of the unit attention flags, until attention flags are provided to initiators in step 1109. One of the initiators services the unit attention flag condition. Next, in step 1110, the virtual unit attention flag reporting is complete.

In the disclosed embodiment, each initiator receives a unit attention flag when a target asserts a unit attention flag even though the target perceives every initiator to be the same address, SD-0, on the FC-SCSI-2 bridge 102. Aside from unit attention flag conditions, one type of SCSI status message, this virtualization process also applies to any SCSI-2 status message and reset reporting in general.

SPECIALIZED COMMANDS BETWEEN AN INITIATOR AND FIBRE CHANNEL/SCSI BRIDGE

Figure 12:
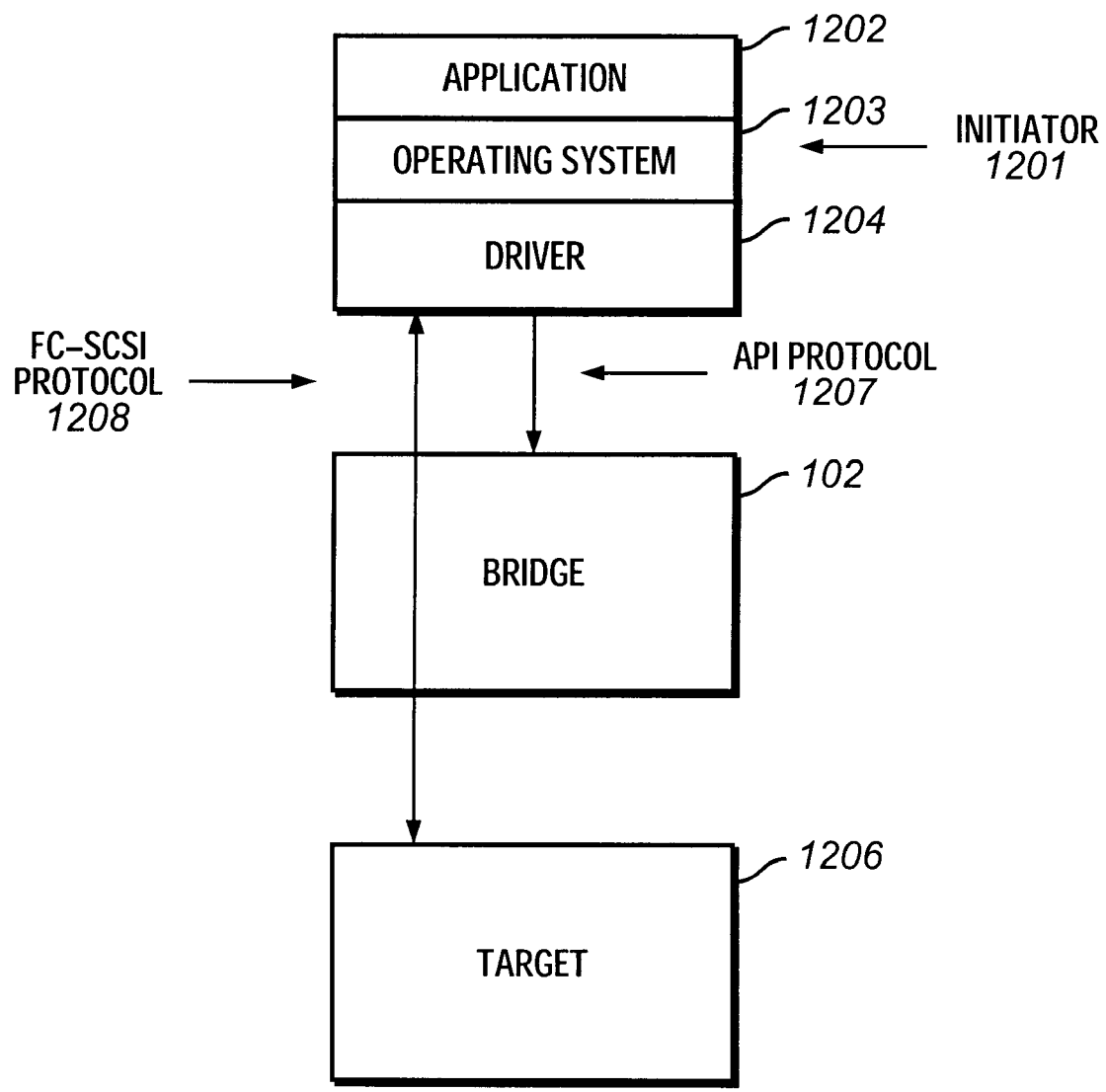
FIG. 12 is a schematic diagram of a computer network including communication of specialized commands between an initiator and the Fibre Channel interconnect medium-to-SCSI-2 bridge using an API protocol in accordance with the present invention.

Typically, a FC-SCSI bridge 102 supports commands directed from a Fibre Channel initiator to a SCSI-2 target device. In accordance with the present invention, however, specialized commands from a Fibre Channel initiator and intended for the FC-SCSI-2 bridge 102 itself are supported by the bridge software 122. In the disclosed embodiment, these specialized commands are embedded in an application programming interface (API) protocol 1207 (FIG. 12). The bridge software 122 is capable of accepting these specialized commands from multiple initiators at any given time. Further, in the disclosed embodiment, the FFCH 120 for executing the bridge software 122 is a Fibre Channel tape controller (FCTC) for controlling a SCSI-2 tape drive 103.

Referring to FIG. 12, a schematic diagram of a computer network N providing an API protocol 1207 for communication of the specialized commands is shown. The commands are issued by an application 1202 in the initiator 1201. A driver 1204 provides the commands from the initiator 1201 to the bridge 102 using an API. Data responsive to the commands may be returned from the bridge 102 to the driver 1204. The driver 1204 links an operating system 1203 to the bridge 102. The protocol of the API is specially configured as described below for the bridge 102 to distinguish normal pass-through commands for a target device 1206 from special commands intended for the bridge 102. In the disclosed embodiment, the API-protocol 1207 is in effect "tunneled" beneath the FC-SCSI protocol 1208.

Specialized vendor-specific commands may be issued in the form of SCSI write buffer or read buffer commands. Below is a table of an exemplary list of commands and the corresponding buffer command type:

| VENDOR-SPECIFIC COMMANDS | BUFFER COMMAND TYPES |
| --- | --- |
| RESET BUS OR DEVICE | WRITE BUFFER COMMAND |
| INQUIRE UNIQUE FCTC ID | READ BUFFER COMMAND |
| GET LOGICAL-PHYSICAL MAPPING | READ BUFFER COMMAND |
| SET LOGICAL-PHYSICAL MAPPING | WRITE BUFFER COMMAND |
| UPDATE FIRMWARE | WRITE BUFFER COMMAND |
| QUERY ATTACHED SCSI DEVICES | READ BUFFER COMMAND |

Each command contains a command data block (CDB) which informs the bridge software 122 that the command is intended for the bridge 102. The general layout of the read buffer/write buffer commands used to issue the vendor-specific command is provided below:

| Byte/Bit | 7 | 6 | 5 | 4 | 3 | 2 | 1 | 0 |
| --- | --- | --- | --- | --- | --- | --- | --- | --- |
| 0 | Operation Code = 0 × 3C (Read Buffer)/0 × 3B (Write Buffer) | | | | | | | |
| 1 | Reserved = 000000b | | | | | | Mode = 01b | |
| 2 | Vendor Command Code: Read = xx/Write = 0 × 00 (reserved) | | | | | | | |
| 3 | "A" | | | | | | | |
| 4 | "B" | | | | | | | |
| 5 | "C" | | | | | | | |
| 6 | Reserved = 0 × 00 | | | | | | | |
| 7 | Data Allocation Length (MSB) | | | | | | | |
| 8 | Data Allocation Length (LSB) | | | | | | | |
| 9 | Control Code (Reserved = 0 × 00) | | | | | | | |

Byte 0 of the command layout or CDB is used to indicate either a read buffer command or a write buffer command. In the disclosed embodiment, 0x3C represents a read buffer command, and 0x3B represents a write buffer command. When a write buffer command is used, an outbound data a buffer stores the vendor command code 2 and any required command parameters as described below. Byte 1 of the CDB includes a mode bit for indicating the vendor-unique command. Byte 2 of the CDB indicates whether the specialized command is of a read variety or a write variety. In the disclosed embodiment, xx represents a read type command, and 0x00 represents a write type command. Bytes 3–6 of the CDB store ASCII characters (A,B,C) representing a particular vendor. Bytes 6–7 of the CDB represent the data allocation length field. For a read buffer command, the data allocation length field specifies the amount of storage space allocated for the data to be returned. For a write buffer command, the data allocation length field must be sufficient to accommodate the command code and the command parameters necessary to complete the command.

RESET BUS OR DEVICE COMMAND

A reset or device command has not been provided by Fibre Channel protocol (FCP). In accordance with the present invention, a reset bus command is provided as a specialized command for communication between a Fibre Channel initiator and the FC-SCSI bridge 102. The reset bus or device command uses a write buffer command to reset a bus or device specified with a physical ID or a SCSI device mapped to a FCP LUN value. In the disclosed embodiment, for a reset bus or device command, a mode bit is set to vendor-unique (01b), byte 2 is set to 0x00, and bytes 6–8 are set to the length of the outbound data length. The outbound data field associated with the reset bus or device command is displayed below:

| Byte | Value | Description |
| --- | --- | --- |
| 0 | 0x00 | Command Code (MSB) |
| 1 | 0x01 | Command Code (LSB) |
| 2 | 0x01, 0x02, or 0x03 | Parameter Code:<br>0x01 - Reset SCSI bus specified by physical bus ID<br>0x02 - Reset a device specified by FCP LUN<br>0x03 - Reset physical Bus specified by FCP LUN |
| 3 | xx | Physical Bus ID or mapped FCP LUN value |

In the disclosed embodiment, bytes 0–1 represent the command code; byte 2 represents the parameter code; and byte 3 represents the physical bus ID or mapped FCP LUN value. Byte 3 specifies the particular value or ID of the bus or device to be reset.

INQUIRE UNIQUE FCTC ID COMMAND

The Inquire Unique FCTC ID command is a read buffer command for returning unique hardware information from the FCTC 120. In the disclosed embodiment, for the Inquire Unique FCTC ID command, a mode field is set to vendor unique (01b); byte 2 is set to vendor command code; and bytes 6–8 are set to the amount of return data expected. In response to the Inquire Unique FCTC ID command, the FCTC 120 returns the following information: vendor ID, product ID, FCTC firmware revision level, Fibre Channel World Wide Name, and Ethernet address. Other useful information may also be returned.

GET LOGICAL TO PHYSICAL DEVICE MAPPING COMMAND

The Get Logical To Physical Device Mapping command is used to obtain the mapping between FCP LUN values and a SCSI bus: target: LUN. This command returns a data buffer containing device mapping information. In particular, the logical to physical device mapping table is returned. Hosts wishing to associate a physical SCSI device with a specific FCP LUN number will use this command to determine the current device mapping. The return data for this command includes for each device four contiguous bytes called a "device record." The device record describes mapping information for the associated device. In the device record, one byte represents an FCP LUN value, a second byte represents a SCSI bus, a third byte represents a SCSI target, and a fourth byte represents a SCSI LUN. A byte is also specified for indicating the number of devices to be mapped.

SET LOGICAL TO PHYSICAL DEVICE MAPPING COMMAND

The Set Logical To Physical Device Mapping command used a write buffer operation to set the mapping between a FCP LUN value and the SCSI bus: target: LUN. Before issuing the first Set of Logical To Physical Device Mapping command, the host must issue the Get Logical To Physical Device Mapping command to determine the mapping currently in use. For this command, the mode is set to vendor-unique (01b); byte 2 is set to 0x00; and bytes 6–8 are set to the length of the outbound data length. In the disclosed embodiment, one byte is used to contain the number of devices to be mapped. As with the Get Logical To Physical Device Mapping command, a device record is employed to describe the mapping information for a device. Once a host has issued a Set Logical To Physical Device Mapping command, the FCTC 120 retains the logical to physical mapping until the next such command is issued or mapping is changed.

UPDATE FIRMWARE COMMAND

The Update Firmware command is used to download firmware to the FCTC 120. Multiple Update Firmware commands may be needed to accomplish the total transfer. When the download process is complete and the firmware image has been successfully written to a system memory 142 or 143 (preferably flash ROM), the FCTC 120 may be rebutted with the updated firmware. If an error occurs, the FCTC 120 will not reboot. For the Update Firmware command, the mode is set to vendor-unique (01b); byte 2 is set to 0x00; and bytes 6–8 are set to the outbound data length. Byte 3 of the Update Firmware command data field controls the firmware update process.

QUERY ATTACHED SCSI DEVICES COMMAND

The Query Attached SCSI Devices command causes the FCTC 120 to perform discovery on the SCSI bus 151 and return to the host a list of attached devices in the form of SCSI Bus: target: LUN. In the disclosed embodiment, this command is a read buffer command with the mode set to vendor-unique (01b), byte 2 set to the vendor command code, and bytes 6–8 set to the amount of return data expected. The return data for the Query Attached SCSI Devices command includes the number of attached SCSI devices discovered and the bus ID, target ID, and LUN ID for each attached device. In addition to retrieving attached device configuration data, this command may be issued to determine the amount of data a device will return to the FCTC 120.

While described in relation to a Fibre Channel interconnect medium and a SCSI-2 device, the present invention is applicable to any non-SCSI transport medium and any SCSI device. In the context of the present invention, a non-SCSI transport medium refers to a transport medium other than a traditional parallel SCSI interface. Also, while the current SCSI-FCP protocol is SCSI-3-FCP, the present invention applies to any SCSI-FCP protocol.

The foregoing disclosure and description of the invention are illustrative and explanatory thereof, and various changes in the number of variables, number of parameters, order of steps, field sizes, data types, code elements, code size, connections, components, and materials, as well as in the details of the illustrated hardware and software and construction and method of operation may be made without departing from the spirit of the invention.

We claim:

1. A method of supporting a SCSI device on a non-SCSI transport medium of a network using a bridge, the network including a plurality of initiators coupled to the non-SCSI transport medium and further including the bridge, the bridge having a non-SCSI front end coupled to the non-SCSI transport medium and a SCSI back end coupled to a SCSI bus, a plurality of SCSI devices being coupled to the SCSI bus, any of the plurality of SCSI devices capable of being a target for any of the plurality of initiators, the method comprising the steps of:

receiving a plurality of SCSI commands by the bridge from the plurality of initiators; and generating a plurality of virtualized SCSI command responses recreated by the bridge for the plurality of SCSI commands without intermediate conversion to another standardized bus protocol.

2. The method of claim 1, wherein the generating a plurality of virtualized SCSI command responses further includes the step of:

tracking the originating command initiators of said plurality of SCSI commands.

3. The method of claim 1, wherein the network is a storage area network.

4. The method of claim 1, wherein the non-SCSI transport medium is a Fibre Channel interconnect medium.

5. The method of claim 1, wherein at least one of said SCSI devices of the plurality of SCSI devices comprises a SCSI-2 device.

6. The method of claim 5, wherein said at least one SCSI-2 device is a SCSI-2 tape drive.

7. The method of claim 1, wherein said plurality of virtualized SCSI command responses include a plurality of virtualized SCSI-2 command responses.

8. The method of claim 1 wherein the non-SCSI transport medium is a Fibre Channel interconnect medium and the step of generating a plurality of virtualized SCSI command responses for the plurality of SCSI commands includes the step of:

generating a plurality of virtualized SCSI-2 reserve and release command responses.

9. The method of claim 8 wherein the step of generating a plurality of virtualized SCSI-2 reserve and release command responses further includes the steps of:

maintaining a data table of unique identifiers for the plurality of initiators;

storing a unique identifier of an initiator issuing a virtualized SCSI-2 reserve command in a logical device record corresponding to a SCSI device of the plurality of SCSI devices targeted by the initiator; and setting a reserve flag in the logical device record to indicate a reserve status for the SCSI device.

10. The method of claim 9, wherein the unique identifier is a Fibre Channel world wide name and an arbitrated loop address.

11. The method of claim 9 further including the steps of:
detecting logical device records having set reserve flags; and
updating the unique identifier of any logical device record having a set reserve flag.

12. The method of claim 11 wherein the unique identifier comprises a Fibre Channel world wide name and an arbitrated loop address, the updating step further including:
locating the Fibre Channel world wide name in the logical device record; and
searching the data table for the arbitrated loop address corresponding to the Fibre Channel world wide name in the logical device record.

13. The method of claim 9 further including the step of:
clearing a reserve flag in a logical device record for the SCSI device in response to a SCSI-2 release command to indicate a non-reserve status.

14. The method of claim 1, wherein each SCSI device of the plurality of SCSI devices includes a plurality of logical units.

15. The method of claim 1, wherein the plurality of SCSI devices and the SCSI back end are coupled to a plurality of SCSI busses.

16. A method of supporting a SCSI device on a non-SCSI transport medium of a network using a bridge, the network including a plurality of initiators coupled to the non-SCSI transport medium and further including the bridge, the bridge having a non-SCSI front end coupled to the non-SCSI transport medium and a SCSI back end coupled to a SCSI bus, a plurality of SCSI devices being coupled to the SCSI bus, any of the plurality of SCSI devices capable of being a target for any of the plurality of initiators, comprising the steps of:
issuing a SCSI status message by a SCSI device of the plurality of SCSI devices to an initiator of the plurality of initiators; and
generating a virtualized SCSI status message to other initiators of the plurality of initiators, the virtualized SCSI status message recreated without intermediate conversion to any other standardized bus protocol.

17. The method of claim 16, wherein the generating step includes the step of:
tracking the other initiators to receive the virtualized SCSI status message.

18. The method of claim 16, wherein the network is a storage area network.

19. The method of claim 16, wherein the non-SCSI transport medium is a Fibre Channel transport medium.

20. The method of claim 16, wherein a SCSI device of the plurality of SCSI devices includes a SCSI-2 device.

21. The method of claim 20, wherein the SCSI-2 device is a SCSI-2 tape drive.

22. The method of claim 16, wherein the SCSI status message is a Fibre Channel status message.

23. The method of claim 16 wherein the non-SCSI transport medium comprises a Fibre Channel transport medium, and wherein the step of generating a virtualized SCSI status message further includes the step of:
generating a virtualized unit attention flag condition to other initiators of the plurality of initiators.

24. The method of claim 23, wherein the step of generating a virtualized unit attention flag condition further including the steps of:
maintaining a list of initiators and associated unit attention flags;
searching said list of initiators and associated unit attention flags to detect the state of said unit attention flags; and
providing a unit attention flag condition to the initiators with unit attention flags indicating that the initiators require a unit attention flag condition on a next command issued to a SCSI device of the plurality of SCSI devices.

25. The method of claim 16, wherein each SCSI device of the plurality of SCSI devices includes a plurality of logical units.

26. The method of claim 16, wherein the plurality of SCSI devices and the SCSI back end are coupled to a plurality of SCSI busses.

27. A method of supporting a SCSI device on a non-SCSI transport medium of a network using a bridge, the network including a plurality of initiators coupled to the non-SCSI transport medium and further including the bridge, the bridge having a non-SCSI front end coupled to the non-SCSI transport medium and a SCSI back end coupled to a SCSI bus, the SCSI device being coupled to the SCSI bus, any of the plurality of SCSI devices capable of being a target for any of the plurality of initiators, comprising the steps of:
receiving a plurality of SCSI commands by the bridge from the plurality of initiators; and
command queuing of the plurality of SCSI commands for virtualizing untagged command processing, the virtualized untagged command recreated without intermediate conversion to any other standardized bus protocol.

28. The method of claim 27 wherein the step of command queuing further including the steps of:
detecting a command from an initiator of the plurality of initiators to a SCSI device of the plurality of SCSI devices;
detecting if said command from an initiator is tagged or untagged;
detecting if the SCSI device is processing a current command if said command is tagged;
delaying issuance of said command until completion of processing of the current command if the SCSI device is processing a current command; and
issuing said command to the SCSI device if the SCSI device is idle.

29. The method of claim 28, further including the steps of:
detecting if the SCSI device is processing a non-tagged current command if said command is tagged;
delaying issuance of said command until completion of processing of the non-tagged current command if the SCSI device is processing a non-tagged current command;
presenting said command to the SCSI device after the step of delaying issuance of said command until completion of processing of the non-tagged current command; and
issuing said command to the SCSI device if the SCSI device is not processing a non-tagged command.

30. The method of claim 27, wherein the network is a storage area network.

31. The method of claim 27 wherein the non-SCSI transport medium comprises a Fibre Channel interconnect medium.

32. The method of claim 27, wherein a SCSI device of the plurality of SCSI devices includes at least one SCSI-2 device.

33. The method of claim 32, wherein said at least one SCSI-2 device is a SCSI-2 tape drive.

34. The method of claim 27, wherein each SCSI device of the plurality of SCSI devices is a plurality of logical units.

35. The method of claim 27, wherein the plurality of SCSI devices and the SCSI back end are coupled to a plurality of SCSI busses.

36. A computer network system comprising:
a plurality of SCSI server-command initiators;
a non-SCSI transport medium connected to said plurality of SCSI server-command initiators;
a plurality of SCSI devices;
at least one SCSI bus connected to said plurality of SCSI devices;
a bridge between said at least one SCSI bus and said non-SCSI transport medium;
said bridge having a first end connected to said non-SCSI transport medium and a second end connected to said at least one SCSI bus;
said bridge having the capability to receive a plurality of commands through the non-SCSI transport medium, said commands being initiated by one or more of the plurality of SCSI server-command initiators;
said bridge further having the capability to generate a plurality of virtualized SCSI command responses recreated without intermediate conversion to another standardized bus protocol for transmission through said at least one SCSI bus to one or more of said plurality of SCSI devices.

37. The computer network system as defined in claim 36 wherein the capability of said bridge to generate a plurality of virtualized SCSI command responses further includes the tracking of the originating SCSI server-command initiators.

38. The computer network system as defined in claim 36 wherein the non-SCSI transport medium is a Fibre Channel interconnect medium.

39. The computer network system as defined in claim 36 wherein at least one of the SCSI devices of the plurality of SCSI devices is a SCSI-2 device.

40. The computer network system as defined in claim 39 wherein said SCSI-2 device is as SCSI-2 tape drive.

41. The computer network system as defined in claim 36 wherein said plurality of generated virtualized SCSI command responses include a plurality of virtualized SCSI-2 command responses.

42. The computer network system as defined in claim 36 wherein the capability to generate a plurality of virtualized SCSI command responses includes generating a plurality of virtualized SCSI-2 reserve and release command responses.

43. The computer network system as defined in claim 42 wherein the generation of a plurality of virtualized SCSI-2 command responses further includes:
the maintenance of a data table of identifiers for each of said plurality of SCSI server-initiators;
the storage of the identifier of a SCSI server-command initiator issuing a SCSI-2 reserve command in a logical device record corresponding to a SCSI device targeted by a SCSI server-command initiator; and
the setting of a reserve flag in the logical device record to indicate a reserve status for the SCSI device.

44. The computer network system as defined in claim 43 wherein the SCSI server-command initiator identifier includes a Fibre Channel world wide name and an arbitrated loop address.

45. The computer network system as defined in claim 43 further including:

the detection of logical device records having a set of reserve flags; and
the updating of the SCSI server-initiator identifier of any logical device record having a set reserve flag.

46. The computer network system as defined in claim 45 wherein the world wide name and the arbitrated loop address of the SCSI server-initiator identifier is updated by:
the location of the Fibre Channel world wide name in the logical device record; and
the search of the data table for the arbitrated loop address corresponding to the Fibre Channel world wide name in the logical device record.

47. The computer network system as defined in claim 43 further including the clearing of a reserve flag in a logical device record for the SCSI device in response to a SCSI-2 release command to indicate a non-reserve status.

48. The computer network system as defined in claim 36 wherein each SCSI device of the plurality of SCSI devices includes a plurality of logical units.

49. The computer network system as defined in claim 36 wherein the plurality of SCSI devices and said first end are coupled to a plurality of SCSI buses.

50. A firmware system for interconnecting a plurality of SCSI server-command initiators connected to a Fibre Channel interconnect medium, to a plurality of SCSI devices connected to at least one SCSI bus, said system comprising:
a Fibre Channel controller connected to the Fibre Channel interconnect medium;
a Fibre Channel device driver connected to said Fibre Channel controller;
a SCSI device driver connected to said Fibre Channel controller;
a SCSI controller connected to said SCSI device driver;
software instructions to enable: (a) receipt of commands by said Fibre Channel controller from said plurality of server-command initiators through the Fibre Channel interconnect medium, and (b) generation of a plurality of virtualized SCSI command responses recreated without intermediate conversion to another standardized bus protocol by said SCSI controller to be transmitted through said at least one SCSI bus to the SCSI devices.

51. The firmware system as defined in claim 50 wherein the generation of a plurality of virtualized SCSI command responses further includes the tracking of the originating server-command initiators of the plurality of command initiated by the SCSI server-command initiators.

52. The firmware system as defined in claim 50 wherein at least one of the SCSI devices of the plurality of SCSI devices is a SCSI-2 device.

53. The firmware system as defined in claim 52 wherein said SCSI-2 device is a SCSI-2 tape drive.

54. The firmware system as defined in claim 50 wherein said plurality of generated virtualized SCSI-2 command responses include a plurality of virtualized SCSI-2 command responses.

55. The firmware system as defined in claim 50 wherein the generation a plurality of virtualized SCSI-2 command responses further includes:
the maintenance of data table of identifiers for each of the plurality of SCSI server-command initiators;
the storage of the identifier of a SCSI server-command initiator issuing a SCSI-2 reserve command in a logical device record corresponding to a SCSI device targeted by the SCSI server-command initiator; and the setting of a reserve flag in the logical device record to indicate a reserve status for the SCSI device.

56. The firmware system as defined in claim 55 wherein the SCSI server-command initiator includes a Fibre Channel world wide name and an arbitrated loop address.

57. The firmware system as defined in claim 55 further including:
   the detection of logical device records having a set of reserve flags; and
   the updating of the SCSI server-command initiator identifier of any logical device record having a set reserve flag.

58. The firmware system as defined in claim 57 where the world wide name and the arbitrated loop address of the SCSI server-command initiator is updated by:
   the location of the Fibre Channel world wide name in the logical device record; and
   the searching of the data table for the arbitrated loop address corresponding to the Fibre Channel world wide name in the logical device record.

59. The firmware system as defined in claim 55 further including the clearing of a reserve flag in a logical device record for the SCSI device in response to a SCSI-2 release command to indicate a non-reserve status.

60. The firmware system as defined in claim 50 wherein the plurality of SCSI devices and said first end are coupled to a plurality of SCSI buses.

61. A computer network system comprising:
   a plurality of SCSI server-command initiators;
   a non-SCSI transport medium collected to said plurality of SCSI server-command initiators;
   a plurality of SCSI devices;
   at least one SCSI bus connected to said devices;
   a bridge between said at least one SCSI bus and said non-SCSI transport medium;
   said bridge having a first end connected to said non-SCSI transport medium and a second end connected to said at least one SCSI bus;
   said bridge having a capability to issue a SCSI status message from one or more of said plurality of SCSI devices to one of said plurality of SCSI server-command initiators; and
   said bridge further having the capability to generate a virtualized SCSI status message to one or more of said plurality of SCSI server-command initiators without intermediate conversion to any other standardized bus protocol.

62. The computer network system as defined in claim 61, wherein the non-SCSI transport medium is a Fibre Channel and the step of generating a virtualized SCSI status message further includes the step of:
   generating a virtualized unit attention flag condition to other initiators of said plurality of SCSI server-command initiators.

63. The computer network system as defined in claim 62, wherein the step of generating a virtualized unit attention flag condition further includes the steps of:
   maintaining a list of said SCSI server-command initiators and associated unit attention flags;
   searching said list of initiators and associated unit attention flags to detect the state of said unit attention flags; and
   providing a unit attention flag condition to said SCSI server-command initiators with unit attention flags indicating the SCSI server-command initiators that require a unit attention flag condition on a next command issued to a SCSI device of the plurality of SCSI devices.

64. A computer network system comprising:
   a plurality of SCSI serve-command initiators;
   a non-SCSI transport medium connected to said plurality of SCSI server-command initiators;
   a plurality of SCSI devices;
   at least one SCSI bus connected to said plurality of SCSI devices;
   a bridge between said at least one SCSI bus and said non-SCSI transport medium;
   said bridge having a first end connected to said non-SCSI transport medium and a second end connected to said at least one SCSI bus;
   said bridge having the capability to receive a plurality of SCSI commands through the non-SCSI transport medium, said commands being initiated by one or more of the plurality of SCSI server-command initiators; and
   said bridge further having the capability to command queue the plurality of SCSI commands for virtualizing untagged command processing, the virtualized untagged command recreated without intermediate conversion to any other standardized bus protocol.

65. The computer network system as defined in claim 64, wherein the capability to generate a command queue further includes the abilities to:
   detect a command from the SCSI server-command initiator to a SCSI device;
   to detect if the command is tagged or untagged;
   to detect if the SCSI device is processing a current demand if the command is tagged;
   to delay the issuance of the command until completion of processing of the current command if the SCSI device is processing the current command and to issue the command to the SCSI device if the SCSI device is idle.

66. The computer network system as defined in claim 64, wherein said bridge has the further capabilities to:
   detect that the SCSI device is processing a non-tagged current command if the command is tagged;
   delay issuance of the command until completion of processing of the non-tagged current command if the SCSI device is processing a non-tagged current command;
   present the command to the SCSI device after the step of delaying issuance of the command until completion of the non-tagged current command; and
   issue the command to the SCSI device if the SCSI device is not processing a non-tagged command.

* * * * *

UNITED STATES PATENT AND TRADEMARK OFFICE
CERTIFICATE OF CORRECTION

PATENT NO. : 6,209,023 B1
DATED : March 27, 2001
INVENTOR(S) : John E. Dimitroff et al.

It is certified that error appears in the above-identified patent and that said Letters Patent is hereby corrected as shown below:

Column 7,
Line 39, after "WWN-0" insert -- , --.
Line 59, delete "hind" and insert therefor -- behind --.

Column 8,
Line 37, delete "to request" and insert therefor -- to a request --.

Column 10,
Line 50, delete "instances," and insert therefore -- instance --.

Signed and Sealed this

Thirteenth Day of December, 2005

JON W. DUDAS
*Director of the United States Patent and Trademark Office*